United States Patent
Kim

(10) Patent No.: US 11,751,309 B2
(45) Date of Patent: Sep. 5, 2023

(54) LIGHT SOURCE DRIVING DEVICE

(71) Applicant: LG INNOTEK CO., LTD., Seoul (KR)

(72) Inventor: Jun Seong Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 17/434,476

(22) PCT Filed: Mar. 10, 2020

(86) PCT No.: PCT/KR2020/003295
§ 371 (c)(1),
(2) Date: Aug. 27, 2021

(87) PCT Pub. No.: WO2020/184947
PCT Pub. Date: Sep. 17, 2020

(65) Prior Publication Data
US 2022/0141935 A1    May 5, 2022

(30) Foreign Application Priority Data
Mar. 12, 2019    (KR) .......................... 10-2019-0027970

(51) Int. Cl.
*H05B 45/46* (2020.01)
*H05B 47/20* (2020.01)
(Continued)

(52) U.S. Cl.
CPC ............. *H05B 45/46* (2020.01); *H05B 45/50* (2020.01); *H05B 45/54* (2020.01)

(58) Field of Classification Search
CPC ........ H05B 45/50; H05B 45/52; H05B 45/54; H05B 47/10; H05B 47/17; H05B 47/20; H05B 47/24; H05B 45/46
See application file for complete search history.

(56) References Cited

U.S. PATENT DOCUMENTS 9,084,327 B2 * 7/2015 Chiu ........................ G05F 3/16
9,591,712 B2    3/2017 Cao
(Continued)

FOREIGN PATENT DOCUMENTS

CN          102651937       8/2012
DE         112013007497     7/2016
(Continued)

OTHER PUBLICATIONS

International Search Report dated Jun. 26, 2020 issued in Application No. PCT/KR2020/003295.
(Continued)

*Primary Examiner* — Thai Pham
(74) *Attorney, Agent, or Firm* — KED & ASSOCIATES, LLP

(57) ABSTRACT

A light source driving device performs a switching control on a third switch of a second control unit by using a control signal of a fourth control unit (overvoltage protection circuit), so as to allow the third switch to be turned on by the control signal of the fourth control unit only in a partial section in which an overvoltage occurs, and then turns off the third switch, thereby quickly releasing the blocking of light emission from the light source so as to be capable of returning to a light emitting state.

20 Claims, 6 Drawing Sheets

(51) Int. Cl.
*H05B 47/24* (2020.01)
*H05B 45/54* (2020.01)
*H05B 45/50* (2022.01)

(56) References Cited

U.S. PATENT DOCUMENTS

| | | | |
|---|---|---|---|
| 9,781,807 B2* | 10/2017 | Cao | H05B 45/38 |
| 2011/0037407 A1* | 2/2011 | Ahn | H05B 45/58 |
| | | | 315/294 |
| 2011/0291591 A1 | 12/2011 | Shiu et al. | |
| 2011/0309758 A1* | 12/2011 | Yu | H05B 45/46 |
| | | | 315/192 |
| 2012/0074845 A1 | 3/2012 | Aoki et al. | |
| 2014/0354159 A1 | 12/2014 | Zhang et al. | |
| 2015/0123552 A1 | 5/2015 | Cao | |
| 2017/0071051 A1 | 3/2017 | Chen et al. | |
| 2017/0127484 A1 | 5/2017 | Cao | |

FOREIGN PATENT DOCUMENTS

| | | |
|---|---|---|
| KR | 10-2008-0083935 | 9/2008 |
| KR | 10-2013-0044747 | 5/2013 |
| KR | 10-1490872 | 2/2015 |
| KR | 10-2016-0065194 | 6/2016 |
| KR | 10-1799530 | 11/2017 |
| KR | 10-2018-0027940 | 3/2018 |

OTHER PUBLICATIONS

European Search Report dated Nov. 7, 2022 issued in Application No. 20769954.7.
Chinese Office Action dated Jun. 1, 2023 issued in Application No. 202080020485.4.

* cited by examiner

LIGHT SOURCE DRIVING DEVICE

CROSS-REFERENCE TO RELATED PATENT APPLICATIONS

This application is a U.S. National Stage Application under 35 U.S.C. § 371 of PCT Application No. PCT/KR2020/003295, filed Mar. 10, 2020, which claims priority to Korean Patent Application No. 10-2019-0027970, filed Mar. 12, 2019, whose entire disclosures are hereby incorporated by reference.

TECHNICAL FIELD

An embodiment relates to a light source driving device.

BACKGROUND ART

A light-emitting diode (LED) is widely used as a light source. Such a light-emitting diode has emerged as a promising market in the vehicle and lighting industry. The light-emitting diode is semi-permanent and capable of high brightness and high output, and thus the light-emitting diode have been actively developed as a light source for a vehicle in recent years.

A light source driving device is required to drive a light source for a vehicle. A protection circuit is provided in the driving device. In general, when an engine is turned on to drive a vehicle, a temporary overvoltage is generated, and such an overvoltage is introduced into an input voltage supplied to the driving device. The light source driving device protects the light source from the overvoltage.

A conventional light source driving device implements a 1-out-all-out function that blocks light emission of all light sources when one of light sources is disconnected due to a failure or the like.

However, in the conventional light source driving device, when an overvoltage is introduced, only the overvoltage should be removed by an operation of the protection circuit, but the operation of the protection circuit eliminates the overvoltage and simultaneously implements the 1-out-all-out function to cause a product failure, and thus there is a problem that product reliability is deteriorated.

Meanwhile, the 1-out-all-out function is maintained unless starting power of the vehicle is forcibly turned off, and accordingly, a state in which the light source is turned off is also maintained. Therefore, when a driver turns on the engine and drives, even though the light source is continuously turned off by the implementation of the 1-out-all-out function, the driver cannot recognize that the light source is turned off because the light source is mounted on the outside of the vehicle. Accordingly, the driver cannot take subsequent measures, for example, measures to recover the light source to light emission, and in particular, another driver does not know the state of the driver's vehicle because the light source of the driver's vehicle is turned off, so that a serious accident may occur.

DISCLOSURE

Technical Problem

An object of the embodiment is to solve the above and other problems.

Another object of the embodiment is to provide a light source driving device that implements a new function.

Still another object of the embodiment is to provide a light source driving device capable of quick discharge.

Still another object of the embodiment is to provide a light source driving device capable of preventing product failures.

Yet another object of the embodiment is to provide a light source driving device capable of improving product reliability.

Technical Solution

According to an aspect of the embodiment to achieve the above or other objects, a light source driving device includes: a light source connected to an input power source and including a plurality of strings each including a plurality of light emitting devices; a first control unit connected to the input power source, the light source, and a ground; a first switch connected to the input power source, the first control unit, and the ground; a second control unit connected to the first control unit, the first switch, and the ground; a second switch connected to the first control unit and the ground; a third control unit connected to the input power source, the first switch, the second switch, and the ground; and a fourth control unit connected to the input power source, the second control unit, and the ground. The fourth control unit may operate in one of a light emission mode, an overvoltage protection mode, and a non-light emission mode and discharge an overvoltage in the overvoltage protection mode.

According to another aspect of the embodiment, a light source driving device includes: a light source connected to an input power source and including a plurality of strings each including a plurality of light emitting devices; a first control unit connected to the input power source, the light source, and a ground; a first switch connected to the input power source, the first control unit, and the ground; a second control unit connected to the first control unit, the first switch, and the ground; a second switch connected to the first control unit and the ground; a third control unit connected to the input power source, the first switch, the second switch, and the ground; and a fourth control unit connected to the input power source, the second control unit, and the ground. An overvoltage protection mode may be divided into a first section in which a first voltage greater than the maximum value of the input voltage is applied and a second section in which a second voltage less than or equal to the maximum value of the input voltage is applied after the first section. The fourth control unit discharges the first voltage and controls the second control unit using the first voltage so as to generate a second output voltage smaller than a first output voltage during the first section, and the first control unit may block light emission of the light source using the second output voltage.

Advantageous Effects

An effect of a light source driving device according to an embodiment will be described as follows.

According to at least one of the embodiments, when at least one of a plurality of light emitting devices included in a light source is disconnected, there is an advantage that it is possible to implement a 1-out-all-out function that quickly blocks light emission from all light emitting devices.

According to at least one of the embodiments, there is an advantage that it is possible to prevent damage to the light source by quickly discharging an overvoltage.

According to at least one of the embodiments, even though an overvoltage is applied, light emission of the light source is temporarily blocked only in a section in which the overvoltage is applied, and then, it is quickly recovered to light emission of the light source, and accordingly, there is an advantage that it is possible to prevent product failures and improve product reliability.

Further scope of applicability of the embodiments will become apparent from the detailed description below. However, since various changes and modifications within the spirit and scope of the embodiments may be clearly understood by those skilled in the art, specific embodiments such as detailed description and preferred embodiments should be understood as being given merely as examples.

MODES OF THE INVENTION

Hereinafter, preferred embodiments of the present invention will be described in detail with reference to the accompanying drawings. However, the spirit and scope of the present invention is not limited to a part of the embodiments described, and may be implemented in various other forms, and within the spirit and scope of the present invention, one or more of the elements of the embodiments may be selectively combined and replaced. In addition, unless expressly otherwise defined and described, the terms used in the embodiments of the present invention (including technical and scientific terms may be construed the same meaning as commonly understood by one of ordinary skill in the art to which this invention belongs, and the terms such as those defined in commonly used dictionaries may be interpreted as having a meaning that is consistent with their meaning in the context of the relevant art. In addition, the terms used in the embodiments of the present invention are for describing the embodiments and are not intended to limit the present invention. In this specification, the singular forms may also include the plural forms unless specifically stated in the phrase, and may include at least one of all combinations that may be combined in A, B, and C when described in "at least one (or more) of A (and), B, and C". Further, in describing the elements of the embodiments of the present invention, the terms such as first, second, A, B, (A, and (b) may be used. These terms are only used to distinguish the elements from other elements, and the terms are not limited to the essence, order, or order of the elements. In addition, when an element is described as being "connected", "coupled", or "connected" to another element, it may include not only when the element is directly "connected" to, "coupled" to, or "connected" to other elements, but also when the element is "connected", "coupled", or "connected" by another element between the element and other elements. Further, when described as being formed or disposed "on (over)" or "under (below)" of each element, the "on (over)" or "under (below)" may include not only when two elements are directly connected to each other, but also when one or more other elements are formed or disposed between two elements. Furthermore, when expressed as "on (over)" or "under (below)", it may include not only the upper direction but also the lower direction based on one element.

Figure 1:
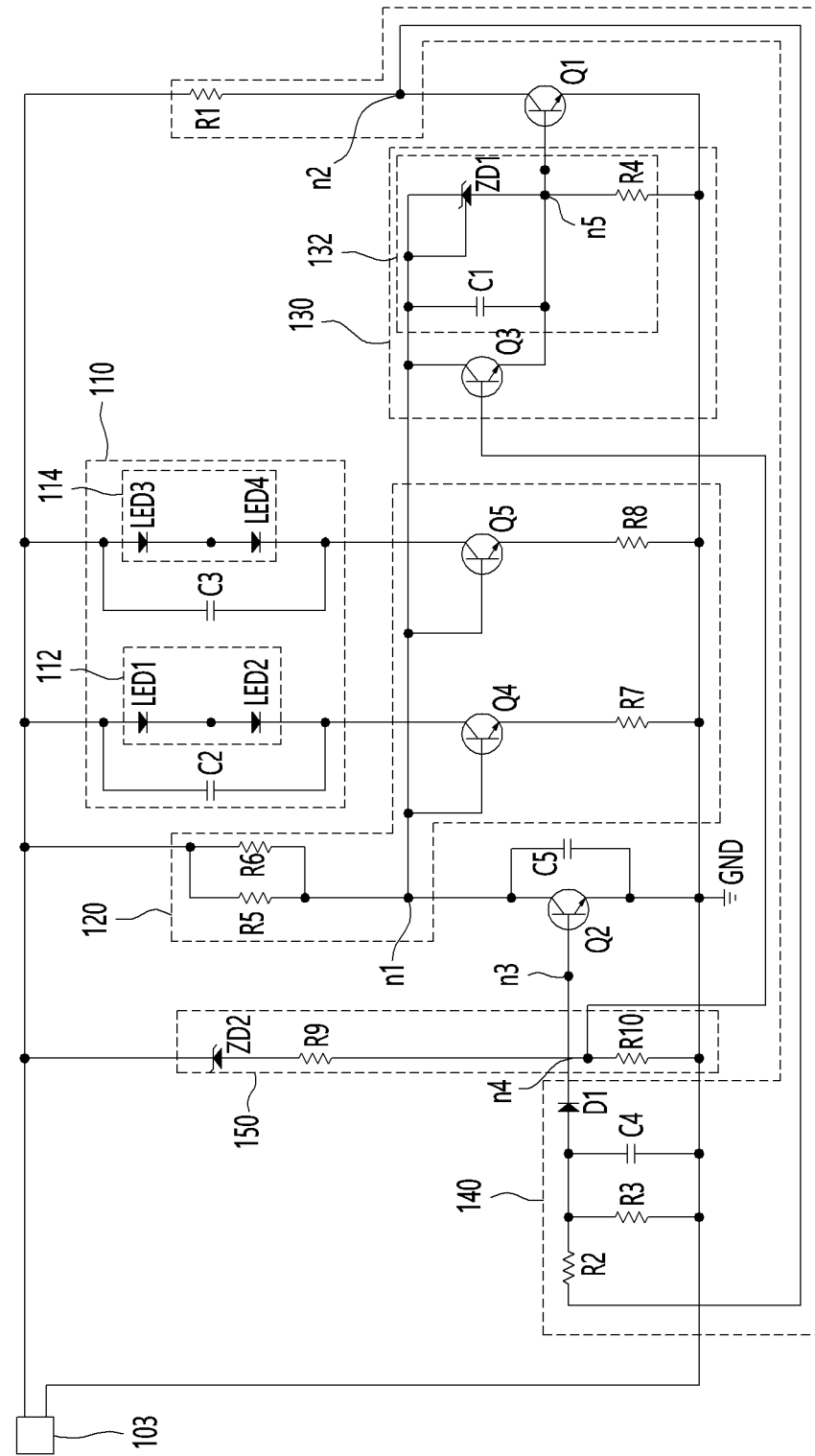
FIG. 1 is a view illustrating a light source driving device according to an embodiment.

FIG. 1 shows a light source driving device according to an embodiment.

Referring to FIG. 1, the light source driving device according to the embodiment may include a light source 110.

The light source 110 may be connected to an input power source 103 and may emit light by an input voltage of the input power source 103. For example, the input power source 103 may supply an input voltage having a range of 9V to 16V. The input power 103 may be supplied from a battery mounted in a vehicle or may be supplied from a DC-DC converter (not shown). The DC-DC converter may convert a voltage of the battery into a desired voltage.

For example, the light source 110 may be a lamp of a vehicle. The lamp of the vehicle may include, for example, a brake lamp, a tail lamp, a backup lamp, or a turn signal lamp.

The input voltage may be supplied by controlling the operation of the lamp of the vehicle. For example, when a driver's command or operation is input, the input voltage may be generated from the input power source 103 under the control of a control device (not shown) to be supplied to the light source 110, or an input voltage previously generated may be supplied to the light source 110. For example, when the driver presses a brake pedal, the input voltage generated by the input power source 103 may be supplied to the light source 110 in response to such a driver's action.

When the driver's command or operation is not input, the input voltage may not be generated from the input power source 103 or the supply of the input voltage to the light source 110 may be cut off. For example, when the driver releases the pressing operation of the brake pedal, the input voltage may not be generated by the input power source 103 or the supply of the input voltage may be cut off in response to the driver's action.

The light source 110 may include, for example, a plurality of strings 112 and 114 connected in parallel to the input power source 103. The string may be referred to as an array or a block instead of a string.

For example, the first string 112 may include a plurality of light emitting devices LED1 and LED2. The light emitting devices LED1 and LED2 may include a semiconductor light emitting device such as a light emitting diode (LED), a light emitting device package or a light emitting device in which the semiconductor light emitting device is adopted, but the embodiment is not limited thereto. The light emitting devices LED1 and LED2 may be connected in series with each other. For example, a second string 114 may include a plurality of light emitting devices LED3 and LED4. The plurality of light emitting devices LED3 and LED4 may be connected to each other in series. As another example, a plurality of light emitting devices LED1 to LED4 included in each of the strings 112 and 114 may be connected in parallel with each other. The number of the light emitting devices LED1 to LED4 included in each of the strings 112 and 114 or a connection method of the light emitting devices LED1 to LED4 may be changed according to specifications or characteristics of various types of the vehicle lamps.

The light source 110 may include capacitors C2 and C3 connected in parallel to each of the strings 112 and 114.

The input voltage of the input power source 103 may be varied according to external circumstances. For example, the input voltage may increase according to strength at which the driver presses the brake pedal. When the input voltage of the input power source 103 is varied, intensity of a light output of the light source 110 may also be varied.

The light source driving device according to the embodiment may include a first control unit 120.

The first control unit 120 may be connected to the input power source 103 to control light emission of the light source 110. For example, the first control unit 120 may receive an input voltage from the input power source 103 and control a driving current according to the input voltage to flow to the light source 110. Therefore, when the first control unit 120 receives the input voltage from the input power source 103, the light source 110 may emit light, and when the first control unit 120 does not receive the input voltage from the input power source 103, the light source 110 may not emit light. As will be described later, the light source 110 may emit light or not emit light by other compulsory means, such as the control of the second switch Q2. Non-emission may refer that light emission from the light source 110 is blocked so that light is not emitted.

The first control unit 120 may include one or more resistors R5 and R6 connected between the input power source 103 and a first node n1 and one or more switches Q4 and Q5 connected between the first node n1 and the ground GND. The resistors R5 and R6 may be connected in parallel with each other. The one or more switches Q4 and Q5 may be provided as many as the number of strings 112 and 114 included in the light source 110. For example, a fourth switch Q4 may be connected to the first string 112 of the light source 110, and a fifth switch Q5 may be connected to the second string 114 of the light source 110.

For example, the fourth switch Q4 may include a base terminal connected to the first node n1, a collector terminal connected to the first string 112, and an emitter terminal connected to the ground GND. For example, the fifth switch Q5 may include a base terminal connected to the first node n1, a collector terminal connected to the second string 114, and an emitter terminal connected to the ground GND.

The first control unit 120 may include one or more resistors R7 and R8. A seventh resistor R7 may be connected between the fourth switch Q4 and the ground GND, and an eighth resistor R8 may be connected between the fifth switch Q5 and the ground GND. When the fourth switch Q4 is turned on, the seventh resistor R7 may determine a driving current value flowing through the light emitting devices LED1 and LED2 included in the first string 112. When the fifth switch Q5 is turned on, the eighth resistor R8 may determine a driving current value flowing through the light emitting devices LED3 and LED4 included in the second string 114.

For example, the light emitting devices LED1 and LED2 included in the first string 112 of the light source 110 may be emitted by a following driving current $I_{LED}$. A driving current flowing through the light emitting devices LED3 and LED4 included in the second string 114 may also be equally applied to Equation 1 and Equation 2 below.

$$I_{LED} = \beta \times I_b \quad \text{[Equation 1]}$$

$\beta$ is a constant, and $I_b$ may indicate a base current of the fourth switch Q4.

In Equation 1, the base current $I_b$ may be calculated by Equation 2.

$$I_b = \frac{V_{reg} - V_{be}}{(\beta + 1)R_7} \quad \text{[Equation 2]}$$

Vreg indicates the voltage of the first node n1, Vbe indicates the base-emitter voltage of the fourth switch Q4, and R7 indicates the resistance value of the seventh resistor R7.

The voltage of the first node n1 may be determined by a breakdown voltage of the first zener diode ZD1 of the second control unit 130 and the base-emitter voltage Vbe of the first switch Q1. For example, when the third switch Q3 is turned on, since the first node n1 and a fifth node n5 are short-circuited, the voltage of the first node n1 may have the base-emitter voltage Vbe of the first switch Q1. For example, when the third switch Q3 is turned off, the voltage of the first node n1 may have a sum Vtotal of the breakdown voltage of the first zener diode ZD1 and the base-emitter voltage Vbe of the first switch Q1.

In the embodiment, it is assumed that the base-emitter voltage Vbe of the first switch Q1 and the base-emitter voltage Vbe of the fourth switch Q4 shown in Equation 2 are the same, but the embodiment is not limited thereto.

In this case, when the third switch Q3 is turned on, since the voltage of the first node n1 has the base-emitter voltage Vbe of the first switch Q1, when the voltage of the first node n1 is substituted into Equation 2, the base current $I_b$ becomes 0, and when this value is substituted into Equation 1, the driving current $I_{LED}$ of the first light emitting device LED1 becomes 0, and thus the light emitting devices LED1 and LED2 included in the first string 112 may not emit light. That is, when the third switch Q3 is turned on, the plurality of light emitting devices LED1 to LED4 included in each of the strings 112 and 114 of the light source 110 may not emit light.

When the third switch Q3 is turned off, the voltage of the first node n1 has the voltage Vtotal corresponding to the sum of the breakdown voltage of the first zener diode ZD1 and the base-emitter voltage Vbe of the first switch Q1, and thus when the voltage of the first node n1 is substituted in Equation 2, the base current $I_b$ may be expressed as Equation 3.

$$I_b = \frac{V_{ZD1}}{(\beta + 1)R_7} \quad \text{[Equation 3]}$$

When substituting Equation 3 into Equation 1, the driving current $I_{LED}$ of the light emitting devices LED1 and LED2 included in the first string 112 may be expressed as Equation 4.

$$I_{LED} = \beta \times (V_{ZD1}/((\beta+1)R_7)) \quad \text{[Equation 4]}$$

Therefore, the light emitting devices LED1 and LED2 included in the first string 112 may emit light with a brightness corresponding to the driving current $I_{LED}$ shown in Equation 4.

The light source driving device according to the embodiment may include the first switch Q1.

The first switch Q1 may be connected to the input power source 103. For example, the first switch Q1 may be connected to the input power source 103 through the first resistor R1. For example, the first switch Q1 may be connected to the input power source 103 and the first control unit 120. More specifically, the first switch Q1 may include a base terminal connected to the fifth node n5, a collector terminal connected to a second node n2, and an emitter terminal connected to the ground GND.

The first switch Q1 may be operated in different modes depending on whether the first switch Q1 is switched.

For example, when the first switch Q1 is turned off, it may be operated in a first mode. The first mode may be a mode in which light emission of the light source 110 is blocked, that is, a latch mode. The latch mode may be referred to as a non-emission mode. In the latch mode, the input voltage of the input power source 103 may be supplied to a third control unit 140 via the second node n2. In this case, the second switch Q2 is turned on by the distribution voltage distributed by the third control unit 140 based on the input voltage, so that light emission of the light emitting device LED1 to LED4 included in each of the strings 112 and 114 of the light source 110 may be blocked.

Specifically, when the first switch Q1 is turned off, the latch mode may be selected and executed. That is, when the first switch Q1 is turned off, it may be operated in the latch mode. Specifically, when the first switch Q1 is turned off, the input voltage of the input power source 103 may be supplied to the third control unit 140 to operate in the latch mode. That is, a control signal is output from the third control unit 140 by an operation of the third control unit 140, and the second switch Q2 may be turned on by the control signal. The control signal may have a voltage value. The input voltage of the input power source 103 supplied to the third control unit 140 may be a voltage for triggering the operation of the third control unit 140. As the second switch Q2 is turned on, the voltage of the first node n1 becomes a voltage of the ground GND, for example, 0V, so that the fourth and fifth switches Q5 are turned off and light emission of the light emitting devices LED1 to LED4 included in each of the strings 112 and 114 of the light source 110 may be blocked.

For example, when the first switch Q1 is turned on, it may be operated in a second mode. The second mode may be a light emission mode in which the light source 110 emits light. In the light emission mode, the input voltage of the input power source 103 may flow to the ground GND via the second node n2 and the first switch Q1. Accordingly, since the second switch Q2 is not turned on and is maintained in a turned-off state, the light emitting devices LED1 to LED4 included in each of the strings 112 and 114 of the light source 110 may continuously emit light.

The light source driving device according to the embodiment may include the second control unit 130. The second control unit 130 may control the first switch Q1. The second control unit 130 may be connected to the first control unit 120, a fourth control unit 150, and the first switch Q1.

The second control unit 130 may include a constant voltage circuit 132 that maintains a constant voltage and the third switch Q3 that changes a control signal (or output voltage) of the constant voltage circuit 132. The constant voltage circuit 132 may include the first zener diode ZD1 having a breakdown voltage that maintains the constant voltage. The first Zener diode ZD1 may be connected between the first node n1 and the fifth node n5. The constant voltage circuit 132 may include a capacitor C1 as a filter for removing noise flowing into the first node n1. The capacitor C1 may be connected in parallel with the first Zener diode ZD1. The constant voltage circuit 132 may include a fourth resistor R4 connected to the fifth node n5 and the ground GND.

The third switch Q3 may include a base terminal connected to the fourth control unit 150, a collector terminal connected to the first node n1, and an emitter terminal connected to the fifth node n5. The third switch Q3 may be switching-controlled by a control signal (or output voltage) of the fourth control unit 150. The control signal of the fourth control unit 150 may be a distribution voltage generated by voltage distribution. An intensity, level, or value of a control signal of the second control unit 130 may be changed according to the switching control of the third switch Q3.

For example, when the third switch Q3 is turned off, the control signal of the second control unit 130 may have the voltage Vtotal corresponding to the sum of the breakdown voltage of the first zener diode ZD1 and the base-emitter voltage Vbe of the first switch Q1. The first switch Q1 may be turned on by a control signal having the voltage Vtotal. The control signal of the second control unit 130 may be an output voltage.

For example, when the third switch Q3 is turned on, the control signal of the second control unit 130 may have the base-emitter voltage Vbe of the first switch Q1. The first switch Q1 may be turned on by the control signal having the base-emitter voltage Vbe of the first switch Q1.

Therefore, the first switch Q1 may be turned on regardless of whether the third switch Q3 is turned off or turned on. However, a current flowing through the first switch Q1 turned-on when the third switch Q3 is turned off and when the third switch Q3 is turned on may be different.

For example, when the third switch Q3 is turned off, the control signal of the second control unit 130 may have the voltage Vtotal corresponding to the sum of the breakdown voltage of the first zener diode ZD1 and the base-emitter voltage Vbe of the first switch Q1. In contrast, when the third switch Q3 is turned on, the control signal of the second control unit 130 may have the base-emitter voltage Vbe of the first switch Q1. Accordingly, the control signal of the second control unit 130 when the third switch Q3 is turned off may have a higher level than the control signal of the second control unit 130 when the third switch Q3 is turned on. Therefore, the former may allow a larger current to flow through the first switch Q1 than the latter. In the former case, all the input voltages of the input power source 103 may flow to the ground through the first switch Q1, whereas in the latter case, a part of the input power of the input power source 103 may flow through the first switch Q1 to the ground, and the other part may be supplied to the second switch Q2 through the third control unit 140.

Therefore, by controlling the turn on/off of the third switch Q3, when an overvoltage is applied, the light emission of the light source 110 may be temporarily blocked while the overvoltage is discharged by the fourth control unit 150, that is, only while the third switch Q3 is turned on, and when the overvoltage is discharged by the fourth control unit 150 and the third switch Q3 is turned off, the light emission of the light source 110 may be recovered due to the release of the light emission blocking of the light source 110. Accordingly, a failure of the product, that is, the light source for the vehicle may be prevented by preventing the latch mode from being executed.

The overvoltage may be, for example, a voltage greater than the maximum value of the input voltage. For example, when the engine of the vehicle is turned on, a voltage of 45V, for example, is instantaneously generated by the high voltage of the battery, and the overvoltage may be included in the input voltage of the input power source 103 and supplied to the light source 110. In the embodiment, the light source 110 may be protected by quickly discharging the overvoltage to the ground GND by the fourth control unit 150.

When an overvoltage is applied in the related art, the latch mode is continuously executed and the light emission of the light source is continuously blocked unless the driver artificially forcibly turns the engine off and then on again, thereby causing product failures. Further, such a problem may cause a serious accident because another driver may not grasp a situation of the driver's vehicle, for example, whether the driver has operated a brake lamp, a tail lamp, a backup lamp or a turn signal lamp.

According to the embodiment, even when an overvoltage is applied, the light emission of the light source 110 is blocked only during a temporary section in which the overvoltage is applied by controlling the second switch Q2 to turn on/off using the control signal of the fourth control unit 150, and thereafter, the light emission of the light source 110 is recovered, thereby preventing product failures and improving product reliability.

The light source driving device according to the embodiment may include the second switch Q2. For example, the second switch Q2 may be connected to the first control unit 120, the first switch Q1, and the ground GND. For example, the second switch Q2 may be connected to the first control unit 120, the third control unit 140, and the ground GND. For example, the light source 110 may emit light or not emit light by switching control of the second switch Q2. Non-emission may refer that light emission of the light emitting devices LED1 to LED4 included in the strings 112 and 114 of the light source 110 is blocked.

The second switch Q2 may include a base terminal connected to the third node n3, a collector terminal connected to the first node n1, and an emitter terminal connected to the ground GND. A fifth capacitor C5 may be connected to the collector terminal and the emitter terminal of the second switch Q2.

When the second switch Q2 is turned off, the light source 110 may emit light by the control of the first control unit 120. When the second switch Q2 is turned on, since the voltage of the first node n1 becomes equal to the voltage of the ground GND, for example, 0V, the fourth and fifth switches Q4 and Q5 of the first control unit 120 are turned off by the voltage of the first node n1, so that light emission of the light source 110 may be blocked. Accordingly, a latch operation may be executed, in which light emission of the light emitting devices LED1 to LED4 included in each of the strings 112 and 114 of the light source 110 that is blocked by the turn-on of the second switch Q2.

The light source driving device according to the embodiment may include the third control unit 140.

The third control unit 140 may be connected between the first switch Q1 and the second switch Q2. The third control unit 140 may be controlled by the first switch Q1, and the second switch Q2 may be controlled by the third control unit 140. For example, when the latch mode is selected by the first switch Q1, that is, when the first switch Q1 is turned off, the third control unit 140 may control the switching control of the second switch Q2. Specifically, when the first switch Q1 is turned off, the input voltage of the input power source 103 may be supplied to the third control unit 140 via the second node n2. The third control unit 140 may generate a control signal (or output voltage) by distributing the input voltage of the input power source 103. The second switch Q2 may be switching-controlled by a control signal from the third control unit 140.

For example, when the control signal of the third control unit 140 is at a low-level, the second switch Q2 may be turned off, and when the control signal of the third control unit 140 is at a high-level, the second switch Q2 may be turned on. Specifically, when the first switch Q1 is turned off and the input voltage of the input power source 103 is supplied to the third control unit 140 via the second node n2, the control signal generated in the third control unit 140 may have the high-level. When the first switch Q1 is turned on and the input voltage of the input power source 103 is not supplied to the third control unit 140 and is supplied to the ground via the second node n2 and the first switch Q1, the control signal generated in the third control unit 140 may have the low-level. The high-level may turn on the second switch Q2, and the low-level may turn off the second switch Q2. The low-level may be the same as a threshold voltage of the diode D1 included in the third control unit 140, but the embodiment is not limited thereto.

The third control unit 140 may include a plurality of resistors R1 to R3. For example, the first resistor R1 may be connected between the input power source 103 and the second node n2. The second resistor R2 may be connected to the second node n2, and the third resistor R3 may be connected to the second resistor R2 in parallel.

The third control unit 140 may include a diode D1. The diode D1 may be connected in series to the second resistor R2 and in parallel to the third resistor R3. For example, the diode D1 may be connected between the second resistor R2 and the third node n3 or may be connected between the third resistor R3 and the third node n3. The third control unit 140 may include a capacitor C4 connected in series to the second resistor R2 and in parallel to the third resistor R3.

For example, the control signal of the third control unit 140 may be a sum of a distribution voltage V1 calculated by the distribution of the first to third resistors R3 and the threshold voltage of the diode D1.

For example, when the threshold voltage of the diode D1 has a value that is negligibly small compared to the distribution voltage V1, the control signal of the third control unit 140 may be the distribution voltage V1.

In the following description, it is assumed that the control signal of the third control unit 140 is the distribution voltage V1 calculated by the distribution of the first to third resistors R3, but the embodiment is not limited thereto.

When the first switch Q1 is turned off and the input voltage of the input power source 103 is supplied to the third control unit 140 via the second node n2, the control signal generated by the third control unit 140 may have a high-level voltage corresponding to the distribution voltage V1 calculated by the distribution of the first to third resistors R3. Therefore, the second switch Q2 may be turned on by the high-level voltage of the third control unit 140.

When the first switch Q1 is turned on and the input voltage of the input power source 103 is supplied to the ground GND via the first switch Q1 and is not supplied to the third control unit 140, the control signal generated in the third control unit 140 may have a low-level corresponding to the threshold voltage of the diode D1. Therefore, the second switch Q2 may be turned off by the low-level voltage of the third control unit 140.

The light source driving device according to the embodiment may include the fourth control unit 150.

The fourth control unit 150 may be connected to the input power source 103, the second control unit 130, and the ground GND.

The fourth control unit 150 may protect the light source 110 from an overvoltage. For example, when the input voltage of the input power source 103 includes an electrostatic voltage due to the influence of a surrounding environment, for example, static electricity or spark, a voltage greater than a preset maximum voltage of the input voltage temporarily flows into the light source 110, so that the light emitting devices LED1 to LED4 of the light source 110 may be damaged. When an input voltage including an overvoltage (hereinafter, referred to as an overvoltage) is supplied from the input power source 103, it is possible to discharge the overvoltage to the ground GND via the fourth control unit 150. Therefore, the fourth control unit 150 may be referred to as an overvoltage protection circuit, an antistatic circuit, or the like.

The fourth control unit 150 may include a second Zener diode ZD2 and at least two resistors R9 and R10. For example, the second zener diode ZD2 and the ninth resistor R9 may be connected between the input power source 103 and a fourth node n4. The second zener diode ZD2 and the ninth resistor R9 may be connected in series with each other. The tenth resistor R10 may be connected between the fourth node n4 and the ground GND. The second zener diode ZD2 may have a breakdown voltage that is not conducted by the input voltage but is conducted by the overvoltage. A distribution voltage distributed by the ninth and tenth resistors R9 and R10 may be generated at the fourth node n4. When the overvoltage is supplied to the fourth control unit 150, the distribution voltage distributed by the ninth and tenth resistors R9 and R10 may be generated at the fourth node n4.

When an overvoltage flows from the input power source 103 to the third control unit 140, the overvoltage is greater than a breakdown voltage of the second zener diode ZD2, so that the second zener diode ZD2 may be conducted. Accordingly, a current path connected to the ground GND via the second Zener diode ZD2 and the ninth and tenth resistors R9 an R10 is formed, so that the overvoltage may be quickly discharged to the ground GND. Since the overvoltage is discharged through the third control unit 140, the overvoltage does not flow into the light source 110, thereby preventing the light source 110 from being damaged. Each resistance value of the seventh and eighth resistors R7 and R8 is relatively small, so that a current may easily flow.

Meanwhile, the fourth node n4 may be connected to the base terminal of the third switch Q3 of the second control unit 130. Accordingly, the third switch Q3 may be switching-controlled by a voltage of the fourth node n4. That is, when the voltage of the fourth node n4 is a low-level, the third switch Q3 may be turned off, and when the voltage of the fourth node n4 is a high-level, the third switch Q3 may be turned on.

The control signal of the second control unit 130 may be adjusted by the voltage of the fourth node n4.

For example, when an overvoltage is not included in the input voltage of the input power source 103, that is, when the input voltage has a normal voltage (emission mode), the second zener diode ZD2 of the fourth control unit 150 may not be conducted, and accordingly, the fourth 4 node n4 may be a low-level voltage. The third switch Q3 of the second control unit 130 may be turned off by the low-level voltage of the fourth node n4. Accordingly, the control signal of the third control unit 140 may have a high-level Vtotal corresponding to the sum of the breakdown voltage of the first zener diode ZD1 and the base-emitter voltage Vbe of the first switch Q1. The first switch Q1 is turned on by the high-level control signal Vtotal, so that the input voltage of the input power source 103 is discharged to the ground GND via the first resistor R1 and the first switch Q1 of the third control unit 140, and a current path is formed through the first control unit 120 and the second control unit 130, and since the voltage of the first node n1 has a high-level, the light source 110 may emit light by turning on the fourth and fifth switches Q4 and Q5.

For example, when an overvoltage is included in the input voltage of the input power source 103 (overvoltage protection mode), a distribution voltage distributed by the ninth and tenth resistors R9 and R10 is generated at the fourth node n4, and the distribution voltage may be a high-level voltage. The third switch Q3 of the second control unit 130 may be turned on by the high-level voltage of the fourth node n4. In this case, the control signal of the second control unit 130 may have the base-emitter voltage Vbe of the first switch Q1. The first switch Q1 may be turned on by the control signal having the base-emitter voltage Vbe of the first switch Q1. Therefore, a part of a current generated through the first resistor R1 by the input voltage of the input power source 103 may flow through the first switch Q1, and another part of the current may be supplied to the base terminal of the second switch Q2 via the third control unit 140. In this case, since the voltage of the first node n1 has the base-emitter voltage Vbe of the first switch Q1, a base current $I^b$ of the fourth switch Q4 or the fifth switch Q5 may be zero by Equation 2 by the voltage of the fourth node n4 having the base-emitter voltage Vbe of the first switch Q1. Accordingly, the driving current $I_{LED}$ of the plurality of light emitting devices LED1 to LED4 included in each of the strings 112 and 114 of the light source 110 becomes zero by Equation 1, so that light emitting devices LED1 to LED4 may be blocked.

Thereafter, when the overvoltage included in the input voltage of the input power source 103 is discharged and is lowered below the maximum value of the input voltage, the second zener diode ZD2 of the fourth control unit 150 is opened and a discharge path through the fourth control unit 150 is not formed any longer. In this case, the fourth node n4 may have a voltage of the ground GND or a voltage close to the same, and the third switch Q3 may be turned off by the voltage of the fourth node n4. According to the third switch Q3 being turned off, the voltage of the first node n1 may have the voltage Vtotal corresponding to the sum of the breakdown voltage of the first zener diode ZD1 and the base-emitter voltage Vbe of the first switch Q1. In this case, the plurality of light emitting devices LED1 to LED4 included in each of the strings 112 and 114 of the light source 110 may emit light in a brightness corresponding to the driving current $I_{LED}$ calculated by Equations 3 and 4.

According to the embodiment, even though an overvoltage is applied, the light emission of the light source 110 is temporarily blocked only during the overvoltage application section (T in FIG. 5), and then, the light source 110 may emit light normally, so that the normal mode may be quickly recovered, thereby preventing product failures and improving product reliability.

Hereinafter, an operation method in various modes will be described. For example, the mode may include an emission mode (normal mode), an overvoltage protection mode, and a non-emission mode.

The emission mode may be a mode in which the light source 110 emits light at a normal voltage. The overvoltage protection mode may be a mode in which a corresponding overvoltage is quickly discharged via another discharge path to prevent damage to the light source 110 when an overvoltage is included in the input voltage.

When one or more of the light-emitting devices LED1 are turned on due to a failure or the like while the plurality of light-emitting devices LED1 to LED4 included in the plurality of strings 112 and 114 of the light source 110 emit light, that is, when the light emitting device LED1 is disconnected (open), the non-emission mode may be a mode in which a function of blocking light emission from all light sources 110 included in the plurality of strings 112 and 114 of the light source 110, that is, the 1-out-all-out function is executed.

[Normal Mode]

Figure 2:
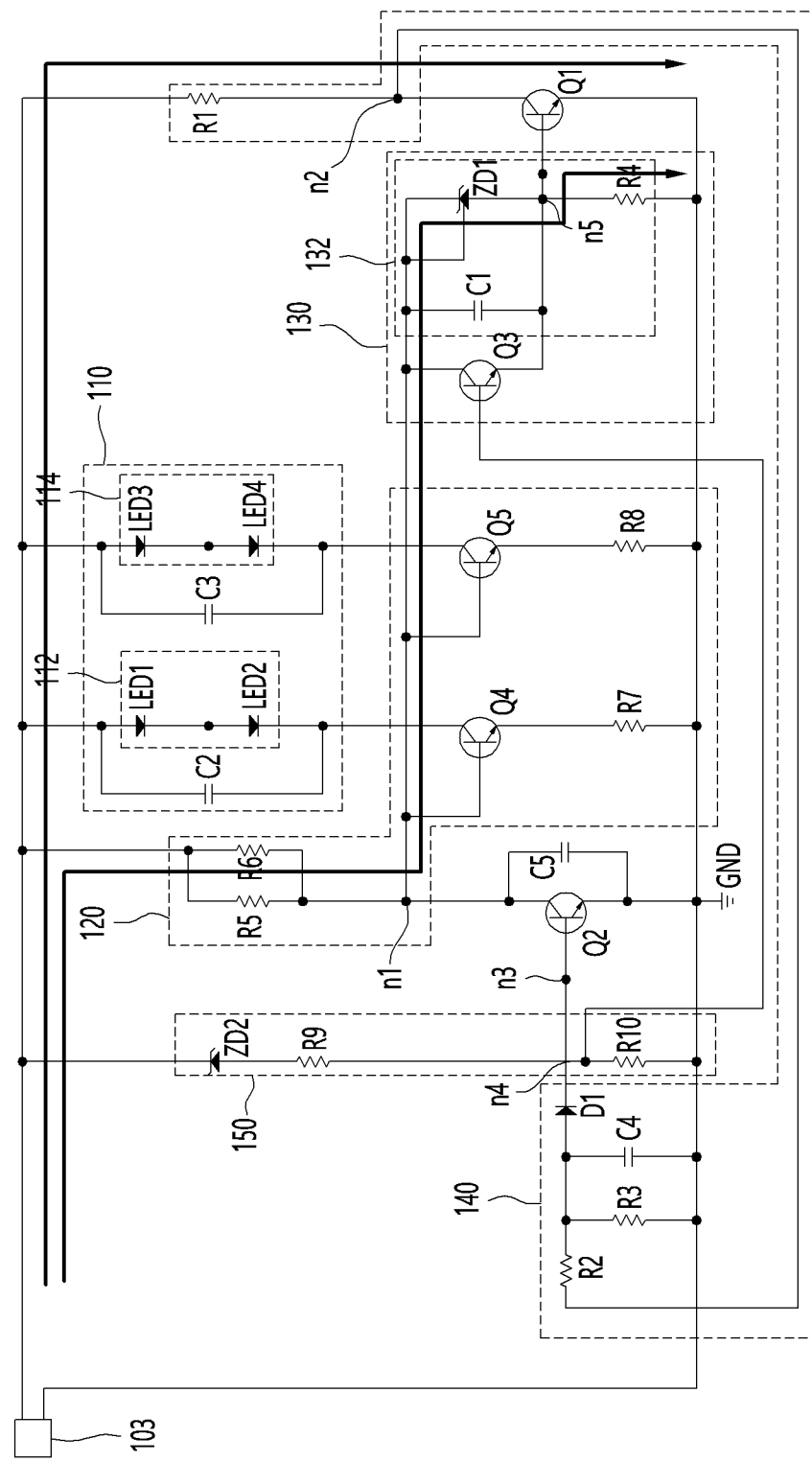
FIG. 2 shows a state in which the light source driving device according to the embodiment operates in a normal mode.

FIG. 2 shows a state in which the light source driving device according to the embodiment operates in a normal mode.

The normal mode may be a mode in which the plurality of light emitting devices LED1 to LED4 included in each of the strings 112 and 114 of the light source 110 emit light by an input voltage that does not include an overvoltage. That is, the input voltage in the normal mode may have a preset rated voltage range. In this case, the overvoltage may be a voltage higher than the maximum value of the input voltage.

As shown in FIG. 2, the input voltage of the input power source 103 may be supplied to the first control unit 120, the fourth control unit 150, and the light source 110 in the normal mode. Since the breakdown voltage of the second zener diode ZD2 is equal to or higher than the maximum value of the input voltage in the fourth control unit 150, the input voltage is not discharged in the fourth control unit 150. The voltage of the first node n1 may be generated by the input voltage input to the second control unit 130. In this case, since the voltage of the first node n1 has the voltage Vtotal corresponding to the sum of the voltage of the first zener diode ZD1 of the second control unit 130 and the base-emitter voltage Vbe of the first switch Q1, the first switch Q1 may be turned on by the voltage of the first node n1. In addition, the base currents of the fourth and fifth switches Q4 and Q5 are generated by the voltage of the first node n1, and a driving current according to the base current flows, so that the plurality of light emitting devices LED1 to LED4 included in each of the strings 112 and 114 of the light source 110 may emit light with a brightness corresponding to a corresponding driving current. Meanwhile, since the first switch Q1 is turned on, the current generated through the first resistor R1 by the input voltage may flow to the ground GND via the first switch Q1 and may not flow to the third control unit 140. Since the first switch Q1 is turned on, the current generated through the first resistor R1 by the input voltage does not flow to the third control unit 140, and the second switch Q2 maintains the turn-off state so that light emission of the light source 110 may be continuously maintained.

[Overvoltage Protection Mode]

Figure 3:
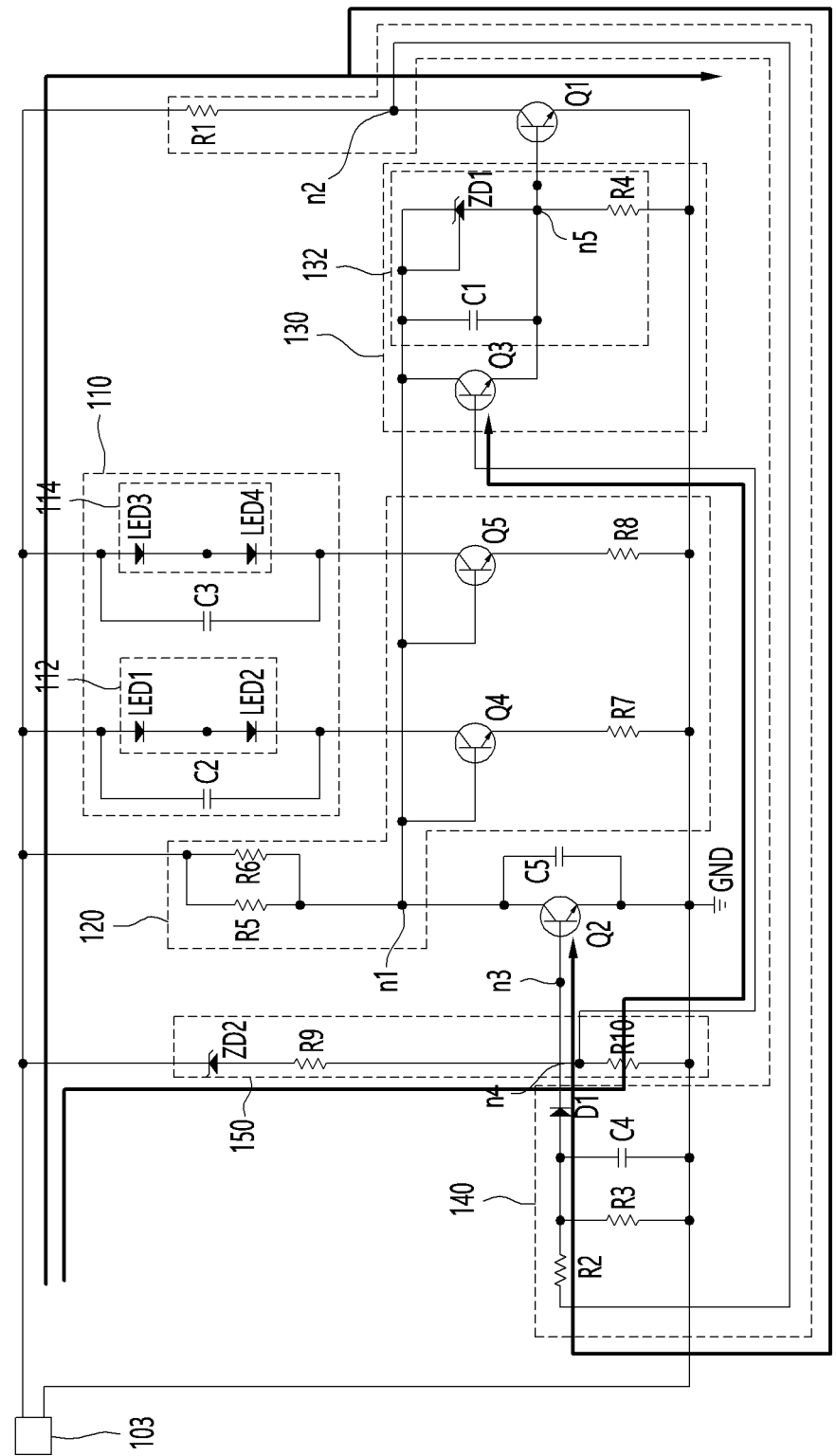
FIG. 3 shows an operation in an overvoltage application section of an overvoltage protection mode in the light source driving device according to the embodiment.
Figure 4:
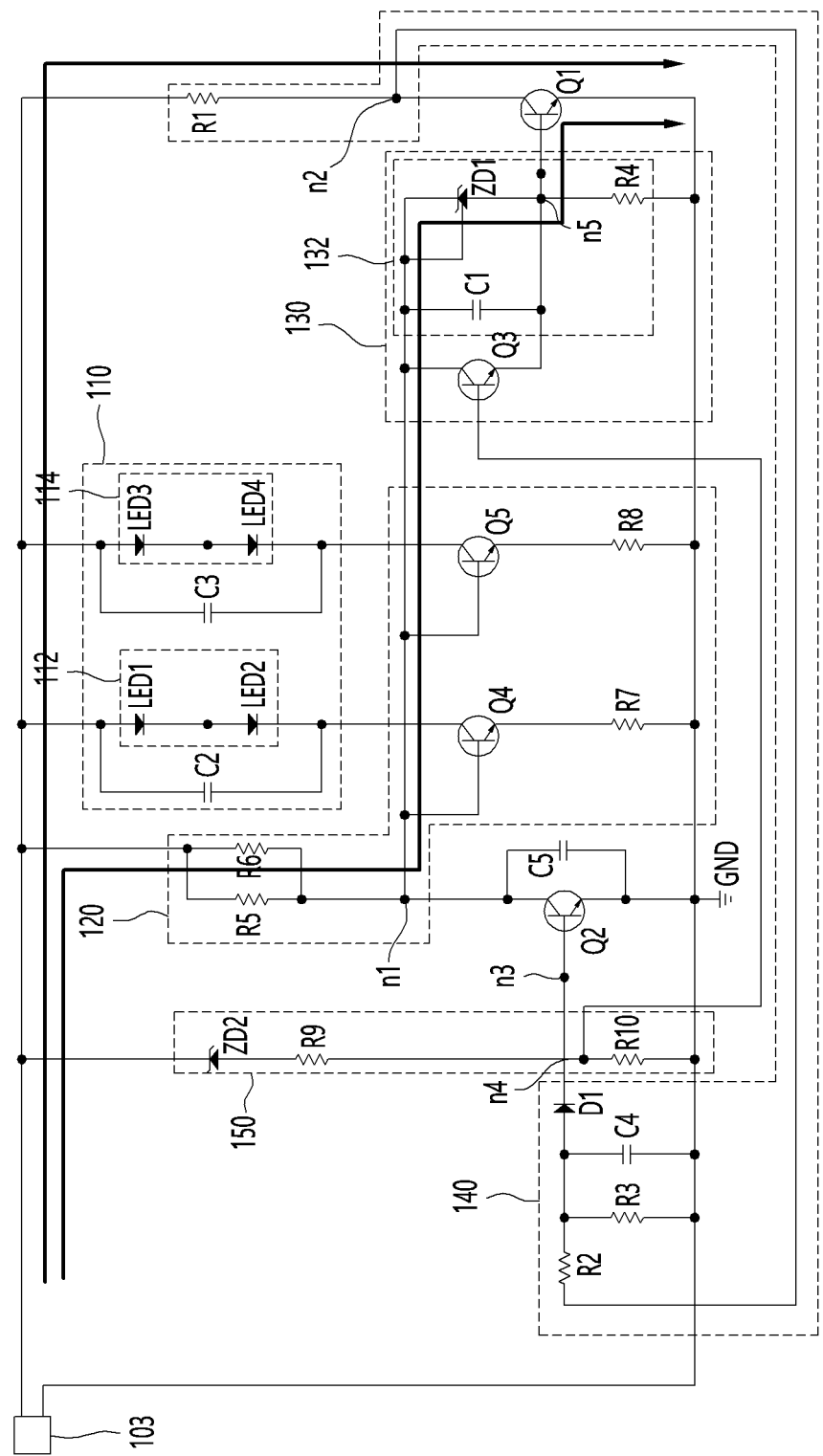
FIG. 4 shows an operation after the end of the overvoltage protection mode in the light source driving device according to the embodiment.
Figure 5A:
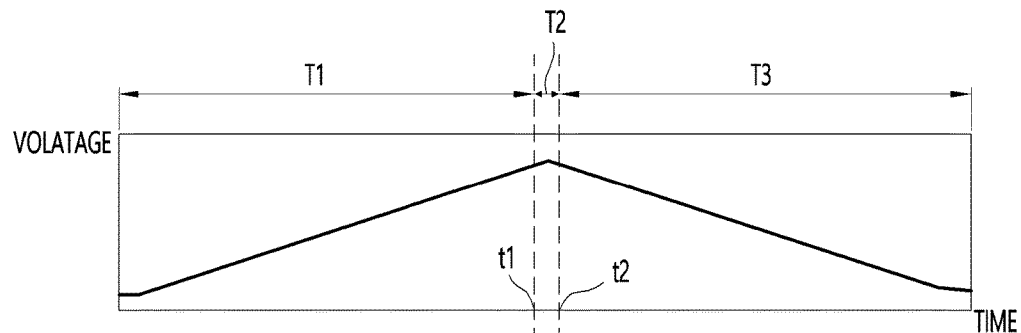
FIG. 5A shows a waveform of an input voltage including an overvoltage.
Figure 5B:
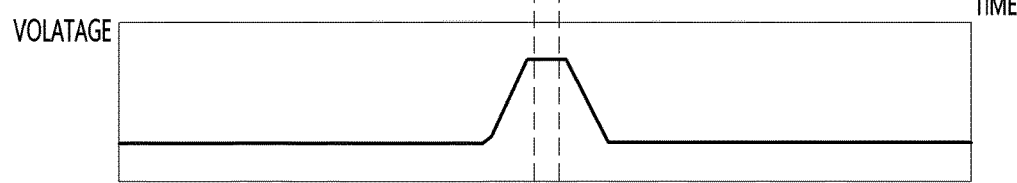
FIG. 5B shows a waveform of a base voltage of a third switch.
Figure 5C:
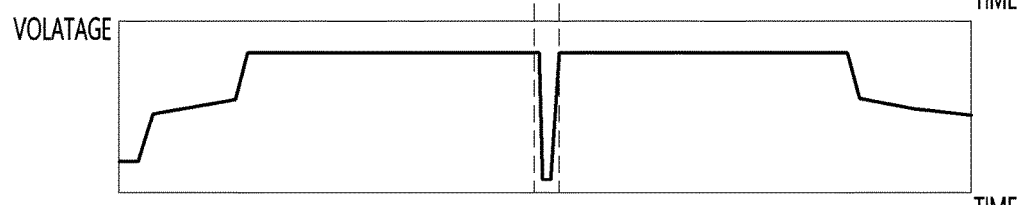
FIG. 5C shows a voltage of a first node.
Figure 5D:
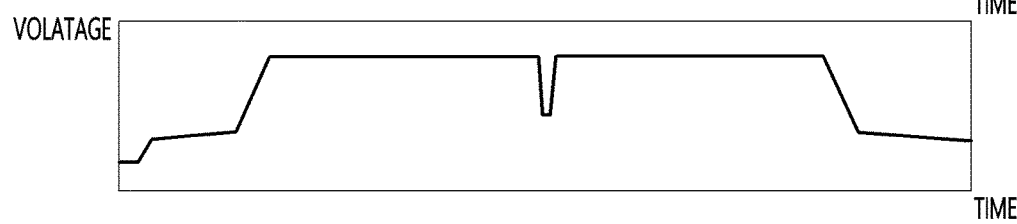
FIG. 5D shows a waveform of a collector-emitter voltage of a second switch.

FIG. 3 shows an operation in an overvoltage application section of an overvoltage protection mode in the light source driving device according to the embodiment, and FIG. 4 shows an operation after the end of the overvoltage protection mode in the light source driving device according to the embodiment. FIG. 5 shows a waveform according to an input voltage including an overvoltage. That is, FIG. 5A shows a waveform of the input voltage including the overvoltage. FIG. 5B shows a waveform of a base voltage of the fourth node. FIG. 5C shows a voltage of the first node n1. FIG. 5D shows a waveform of a collector-emitter voltage of the second switch.

As shown in FIG. 5, the overvoltage protection mode may be described by being divided into a section T2 in which an overvoltage is applied and sections T1 and T3 in which the overvoltage is not applied. That is, an input voltage not including an overvoltage may be applied (T1), and then an input voltage including a generated overvoltage may be applied (T2). Thereafter, when the overvoltage is discharged, the input voltage not including the overvoltage may be applied again (T3).

T1 may be referred to as a first section, T2 may be referred to as a second section, and T3 may be referred to as a third section. The second section T2 may be a section between a first time t1 and a second time t2. The second section T2 is a section in which the overvoltage is included in the input voltage, the first time t1 may be a time point at which the overvoltage becomes greater than the maximum value of the input voltage, and the second time t2 may be a time point at which the overvoltage becomes smaller than the maximum value of the input voltage. Therefore, the overvoltage is generated at the first time t1 and is included in the input voltage, and as described below, the overvoltage is removed due to the discharge by the fourth control unit 150 at the second time t2, and thus the overvoltage may become smaller than the maximum value of the input voltage.

<First Section T1>

The first section T1 is a section in which an input voltage that does not include an overvoltage is applied, and the normal mode is operated in the first section T1, and since a normal operation in the first section T1 may be easily understood from the operation in the normal mode shown in FIG. 2, further description will be omitted.

<Second Section T2>

The second section T2 may be a section in which an input voltage includes an overvoltage due to static electricity or the like is applied.

As shown in FIG. 5, an overvoltage exceeding the maximum value of the input voltage may be included in the input voltage and supplied in the second section T2.

In this case, as shown in FIG. 3, the input voltage (FIG. 5A) included in the overvoltage may be supplied to the first control unit 120, the fourth control unit 150, and the light source 110. When the input voltage including the overvoltage is supplied, the second zener diode ZD2 of the fourth control unit 150 is conducted, so that the overvoltage may be quickly discharged to ground GND via the ninth and tenth resistors R9 and R10. In this case, the overvoltage may be voltage-distributed by the ninth and tenth resistors R9 and R10, and the distributed voltage may be generated at the fourth node n4. As shown in FIG. 5B, the voltage of the fourth node n4 may be a base voltage of the third switch Q3. As shown in FIG. 5B, the voltage of the fourth node n4 is 0V in the first section T1 in which the base voltage of the third switch Q3 does not include the overvoltage, but when the input voltage including the overvoltage is applied to the fourth control unit 150, the voltage of the fourth node n4 may increase from 0V to 1.7V. Therefore, since the voltage of the fourth node n4, that is, 1.7 V, is at least greater than a base-emitter voltage of the third switch Q3, the third switch Q3 may be turned on by the voltage of the fourth node n4.

Meanwhile, the voltage of the first node n1 may be changed according to the turn on/off of the third switch Q3. As described in the above-described normal mode operation, the voltage of the first node n1 in the first section T1 in which the overvoltage is not included may have the voltage Vtotal corresponding to the sum of the breakdown voltage of the first zener diode ZD1 of the second control unit 130 and the base-emitter voltage Vbe of the first switch Q1 as the third switch Q3 is turned off. In contrast, the voltage of the first node n1 in the second section T2 in which the overvoltage is included may have the base-emitter voltage Vbe of the first switch Q1 as the third switch Q3 is turned on. As shown in FIG. 5C, the voltage of the first node n1 in the first section T1 is more than 2V, whereas the voltage of the first node n1 in the second section T2 may be significantly lower than 2V.

When the third switch Q3 is turned on, since the voltage of the first node n1 has the base-emitter voltage Vbe of the first switch Q1 as shown in FIG. 5C, the first switch Q1 may be turned on by the voltage of the first node n1. Therefore, a current generated through the first resistor R1 by the input voltage including the overvoltage may also flow through the first switch Q1 and the third control unit 140. A part of the current generated through the first resistor R1 by the input voltage including the overvoltage may flow through the third control unit 140, and a collector-emitter voltage of the second switch Q2 may be determined by a voltage generated by the voltage distribution in the third control unit 140. As shown in FIG. 5D, as described in the above-described normal mode operation, the collector-emitter voltage of the second switch Q2 is 2V in the first section T1 in which the base voltage of the third switch Q3 does not include the overvoltage, whereas a part of the current generated through the first resistor R1 by the input voltage including the overvoltage flows to the third control unit 140, and a predetermined voltage generated by the voltage distribution in the third control unit 140 is supplied to the second switch Q2 as a control signal, so that the collector-emitter voltage of the second switch Q2 may be reduced to approximately 1V in the second section T2. Even though the collector-emitter voltage of the second switch Q2 is reduced to 1V, the second switch Q2 is not turned on, but a current may flow finely through the second switch Q2.

Meanwhile, when the third switch Q3 is turned on, the voltage of the first node n1 has the base-emitter voltage Vbe of the first switch Q1, and when the voltage of the first node n1 is substituted into Equation 2, the base current $I_b$ becomes 0, and when the value is substituted into Equation 1, the driving current $I_{LED}$ of the first light emitting device LED1 may be zero. Accordingly, the plurality of light emitting devices LED1 to LED4 included in each of the strings 112 and 114 of the light source 110 may not emit light.

In the above, it has been described that the first switch Q1 is turned on even when the third switch Q3 is turned on in the second section T2, but the first switch Q1 may be turned off even though the third switch Q3 is turned on in the second section T2. In this case, the current generated through the first resistor R1 by the input voltage may not flow through the first switch Q1 but may flow through the second control unit 130. In this case, the second switch Q2 is turned on by the voltage generated by the voltage distribution of the second control unit 130, and eventually, the plurality of light emitting devices LED1 to LED4 included in each of the strings 112 and 114 of the light source 110 may not emit light, but the embodiment is not limited thereto.

<Third Section T3>

When the overvoltage is discharged and removed by the fourth control unit 150 in the second section T2, the second section T2 ends at the time point t2 at which the input voltage becomes lower than the maximum value of the preset rated voltage, and a section after the second time t2 may be referred to as the third section T3.

In the third section T3, a voltage lower than the maximum value of the input voltage may be supplied.

In this case, as shown in FIG. 4, the voltage lower than the maximum value of the input voltage may be supplied to the first control unit 120, the fourth control unit 150, and the light source 110. Since the voltage lower than the maximum value of the input voltage is lower than the breakdown voltage of the second zener diode ZD2 of the fourth control unit 150, the discharge by the fourth control unit 150 is operated any longer. Therefore, the voltage of the fourth node n4 of the fourth control unit 150 may be lowered to 0V as shown in FIG. 5B. Therefore, the third switch Q3 is turned off by the voltage of the fourth node n4, and accordingly, as shown in FIG. 5C, the voltage of the first node n1 of 2V may have the breakdown voltage of the first zener diode ZD1 of the second control unit 130 and the base-emitter voltage Vbe of the first switch Q1. Since the first switch Q1 is turned on by the voltage of the first node n1 of 2V, the driving current flows by the voltage of the first node n1 by Equation 3 and Equation 4, so that the light emission blocking of the light source 110 is released, thereby recovering light emission of the light source 110. In addition, a current generated through the first resistor R1 by the voltage lower than the maximum value of the input voltage due to the turn-on of the first switch Q1 may flow to the ground GND via the first resistor R1 and may not flow to the third control unit 140.

[Non-Emission Mode]

Figure 6:
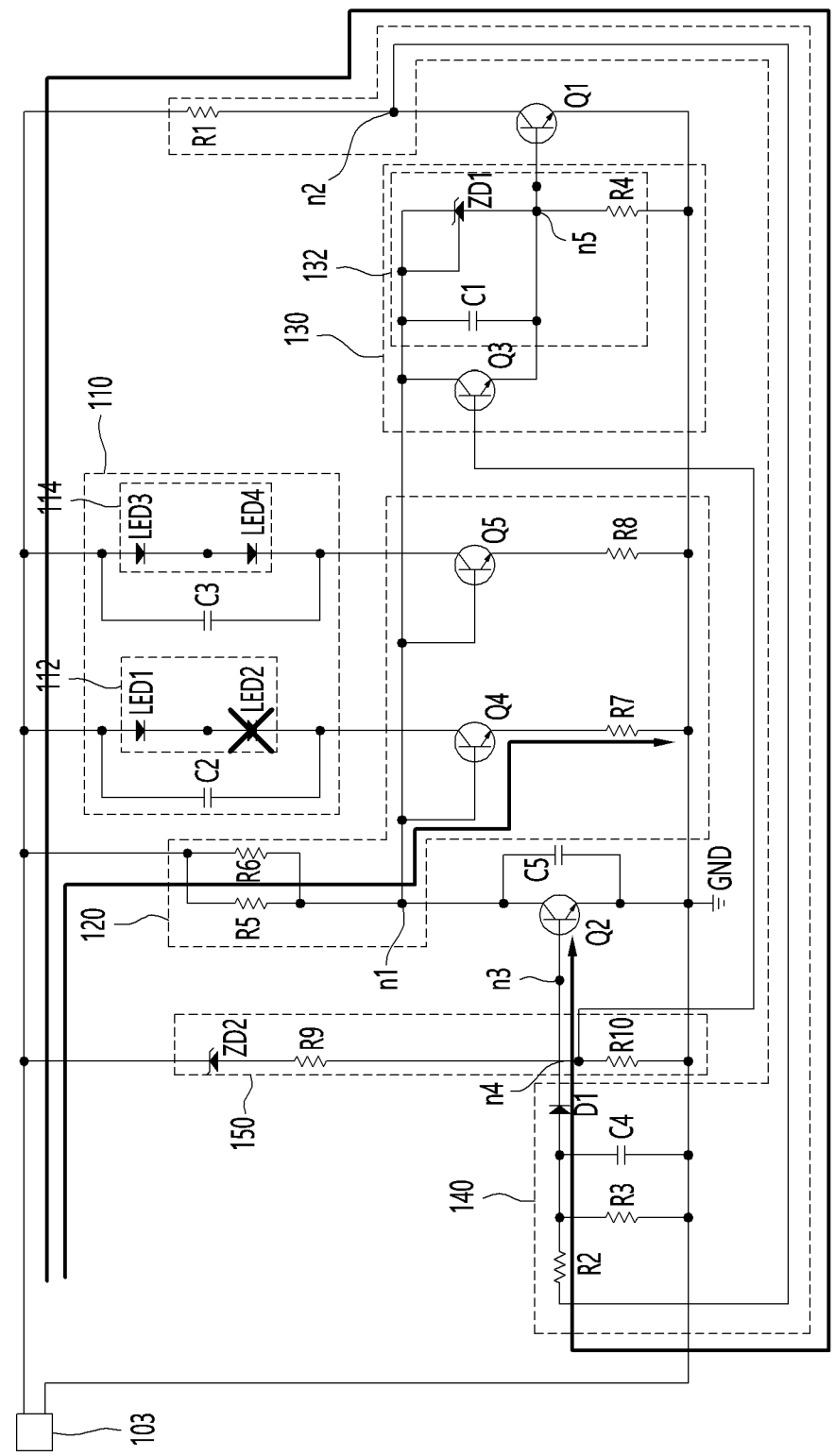
FIG. 6 shows a state in which the light source driving device according to the embodiment operates in a non-emission mode.

FIG. 6 shows a state in which the light source driving device according to the embodiment operates in a non-emission mode.

The non-emission mode may be a mode in which a function of blocking light emission from all light sources 110 included in the plurality of strings 112 and 114 of the light source 110, that is, the 1-out-all-out function is performed when one or more of the light-emitting devices LED1 are turned on due to a failure or the like while the plurality of light-emitting devices LED1 to LED4 included in the plurality of strings 112 and 114 of the light source 110 emit light, that is, when the light emitting device LED1 is disconnected (open).

For example, when the first light emitting device LED1 is disconnected, a current may not flow to the first string 112, and a current may flow to the ground GND via the fifth and sixth resistors R5 and R6 and the seventh resistor R7. In this case, the voltage of the first node n1 may be a sum of a base-emitter voltage of the fourth switch Q4 and a voltage V7 of the seventh resistor R7. Therefore, the voltage of the first node n1 is approximately 1V, and the voltage of the first node n1 is lower than the breakdown voltage of the first zener diode ZD1 of the second control unit 130, and thus the first zener diode ZD1 is not conducted and the first switch Q1 may be turned off. In this case, the current generated through the first resistor R1 by the input voltage of the input power source 103 is supplied to the third control unit 140, so that the second switch Q2 may be turned on by the control signal generated by the voltage distribution of the third control unit 140. As the second switch Q2 is turned on, the voltage of the first node n1 becomes the voltage of the ground GND, and the driving current $I_{LED}$ flowing through the fourth and fifth switches Q4 and Q5 may be zero by Equations 1 and 2. Accordingly, the 1-out-all-out function may be implemented, in which light emission of all light emitting devices LED1 to LED4 included in each of the strings 112 and 114 of the light source 110 connected to the fourth and fifth switches Q4 and Q5 is blocked.

The switches Q1 to Q5 described in the above description include an npn-type BJT transistor, but the embodiment is not limited thereto.

The foregoing detailed descriptions are not restrictively construed in all aspects but should be considered as illustrative purposes. The scope of the embodiment should be determined by rational interpretation of appended claims, and all changes within the equivalent scope of the embodiment are included in the scope of the embodiment.

INDUSTRIAL APPLICABILITY

The embodiment may be applied to a light source for a vehicle.

The invention claimed is:

1. A light source driving device comprising:
a light source connected to an input power source and including a plurality of strings each including a plurality of light emitting devices;
a first control unit connected to the input power source, the light source, and a ground;
a first switch connected to the input power source, the first control unit, and the ground;
a second control unit connected to the first control unit, the first switch, and the ground;
a second switch connected to the first control unit and the ground;
a third control unit connected to the input power source, the first switch, the second switch, and the ground; and
a fourth control unit connected to the input power source, the second control unit, and the ground,
wherein the fourth control unit is operated as one of a light emission mode, an overvoltage protection mode, and a non-light emission mode,
wherein the overvoltage protection mode is divided into a first section in which a first voltage greater than a maximum value of an input voltage is applied, and a second section in which a second voltage less than or equal to the maximum value of the input voltage is applied after the first section, and
wherein the fourth control unit discharges an overvoltage in the overvoltage protection mode.

2. The light source driving device of claim 1, wherein
the input power source supplies the input voltage having a preset minimum value and the maximum value in the light emission mode, and
the input power source supplies the first voltage greater than the maximum value of the input voltage in the overvoltage protection mode.

3. The light source driving device of claim 2, wherein
the fourth control unit discharges the first voltage and controls the second control unit using the first voltage so as to generate a second output voltage smaller than a first output voltage during the first section, and
the first control unit blocks light emission of the light source using the second output voltage.

4. The light source driving device of claim 3, wherein
the input voltage becomes the second voltage of the second section by the discharge of the first voltage,
the fourth control unit controls the second control unit using the second voltage so as to generate the first output voltage during the second section, and
the first control unit emits the light source using the first output voltage.

5. The light source driving device of claim 4, wherein the first control unit includes:
a plurality of third resistors connected to the input power source and a first node;
a plurality of fourth switches connected to the first node, the second control unit, and the light source; and
a plurality of fourth resistors connected to the fourth switches and the ground.

6. The light source driving device of claim 5, wherein the second control unit includes:
a first zener diode connected to the first node and a base terminal of the first switch; and
a third switch connected to the first node, the base terminal of the first switch, and the fourth control unit.

7. The light source driving device of claim 6, wherein
the fourth control unit turns on the third switch using the first voltage during the first section, and
the second control unit generates a base-emitter voltage of the first switch as the second output voltage by turning on the third switch.

8. The light source driving device of claim 7, wherein
the fourth control unit turns off the third switch using the second voltage during the second section, and
the second control unit generates a sum of a breakdown voltage of the first zener diode and the base-emitter voltage of the first switch as the first output voltage by turning off the third switch.

9. The light source driving device of claim 6, wherein the third control unit includes:
a first resistor connected to the input power source and a second node;
at least one or more second resistor connected to the second node; and
a diode connected to the second resistor and a base terminal of the second switch.

10. The light source driving device of claim 9, wherein
at least one of the plurality of light-emitting devices is disconnected while the plurality of light-emitting devices of the plurality of strings emit light in the non-light emission mode,
a voltage of the first node has a sum of a resistance value of the fourth resistors and a base-emitter voltage of the fourth switch in the non-light emission mode, and when the first switch is turned off by the voltage of the first node, the second switch is turned on by a distribution voltage distributed by the first resistor and the second resistor to block light emission of the plurality of light emitting devices of the plurality of strings.

11. The light source driving device of claim 9, wherein the fourth control unit includes:
a second zener diode connected to the input power source;
a fifth resistor connected to the second zener diode and the second control unit; and
a sixth resistor connected to the second control unit and the ground.

12. The light source driving device of claim 11, wherein when the overvoltage is introduced into the input power source together with the input voltage, the second zener diode is conducted by the overvoltage, and a current path leading to the ground via the fifth resistor and the sixth resistor is formed.

13. The light source driving device of claim 12, wherein the second switch is turned on by a distribution voltage distributed by the first resistor and the second resistor using the input voltage to block light emission of the plurality of light emitting devices of the plurality of strings.

14. A light source driving device comprising:
a light source connected to an input power source and including a plurality of strings each including a plurality of light emitting devices;
a first control unit connected to the input power source, the light source, and a ground;

a first switch connected to the input power source, the first control unit, and the ground;
a second control unit connected to the first control unit, the first switch, and the ground;
a second switch connected to the first control unit and the ground;
a third control unit connected to the input power source, the first switch, the second switch, and the ground; and
a fourth control unit connected to the input power source, the second control unit, and the ground, wherein:
the fourth control unit is operated as one of a light emission mode, an overvoltage protection mode, and a none-light emission mode,
the fourth control unit discharges an overvoltage in the overvoltage protection mode
the overvoltage protection mode is divided into a first section in which a first voltage greater than a maximum value of the input voltage is applied and a second section in which a second voltage less than or equal to the maximum value of the input voltage is applied after the first section,
the fourth control unit discharges the first voltage and controls the second control unit using the first voltage so as to generate a second output voltage smaller than a first output voltage during the first section, and
the first control unit blocks light emission of the light source using the second output voltage.

15. The light source driving device of claim 14, wherein the input voltage becomes the second voltage of the second section by the discharge of the first voltage,
the fourth control unit controls the second control unit using the second voltage so as to generate the first output voltage during the second section, and
the first control unit emits the light source using the first output voltage.

16. The light source driving device of claim 14, wherein the first control unit includes:
a third resistor connected to the input power source and a first node;
a fourth switch connected to the first node, the second control unit, and the light source; and
a fourth resistor connected to the fourth switch and the ground.

17. The light source driving device of claim 16, wherein the second control unit includes:
a first zener diode connected to the first node and a base terminal of the first switch; and
a third switch connected to the first node, the base terminal of the first switch, and the fourth control unit.

18. The light source driving device of claim 17, wherein the fourth control unit turns on the third switch using the first voltage during the first section, and
the second control unit generates a base-emitter voltage of the first switch as the second output voltage by turning on the third switch.

19. The light source driving device of claim 18, wherein the fourth control unit turns off the third switch using the second voltage during the second section, and
the second control unit generates a sum of a breakdown voltage of the first zener diode and the base-emitter voltage of the first switch as the first output voltage by turning off the third switch.

20. The light source driving device of claim 17, wherein the third control unit includes:
a first resistor connected to the input power source and a second node;
at least one second resistor connected to the second node; and
a diode connected to the second resistor and a base terminal of the second switch.

* * * * *